(12) United States Patent
Grube et al.

(10) Patent No.: US 6,590,526 B1
(45) Date of Patent: Jul. 8, 2003

(54) APPARATUS FOR CENSUS SURVEYING AND RELATED METHODS

(75) Inventors: Carl Otto Grube, Indian Harbour Beach, FL (US); John Buford Mocharnuk, Melbourne, FL (US); William Leonard Matheson, Palm Bay, FL (US); David Monroe Bell, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 14 days.

(21) Appl. No.: 10/057,167

(22) Filed: Jan. 25, 2002

(51) Int. Cl.⁷ ............................ H04B 7/185; G01S 5/02
(52) U.S. Cl. ............................ 342/357.07; 342/357.06; 342/357.17; 701/213
(58) Field of Search ................ 342/357.07, 357.06, 342/357.01, 357.02, 357.13, 357.17; 701/213, 215

(56) References Cited

U.S. PATENT DOCUMENTS

| | | | |
|---|---|---|---|
| 5,506,588 A | | 4/1996 | Diefes et al. ................ 342/357 |
| 5,633,946 A | * | 5/1997 | Lachinski et al. ........... 382/103 |
| 5,644,318 A | | 7/1997 | Janky et al. ................. 342/357 |
| 5,793,491 A | * | 8/1998 | Wangler et al. ............. 356/376 |
| 5,896,190 A | * | 4/1999 | Wangler et al. ............ 356/4.01 |

* cited by examiner

*Primary Examiner*—Dao Phan
(74) *Attorney, Agent, or Firm*—Allen, Dyer, Doppelt, Milbrath & Gilchrist, P.A.

(57) ABSTRACT

A census surveying system may include a residence position collection apparatus to be carried by a vehicle. The residence position collection apparatus may include a range finder for determining nearby residence positions as the vehicle advances along a path of vehicle travel over an area for the census. The census surveying system may also include a processor for downloading and processing the residence positions from the residence position collection apparatus.

57 Claims, 5 Drawing Sheets

APPARATUS FOR CENSUS SURVEYING AND RELATED METHODS

FIELD OF THE INVENTION

The present invention relates to the field of surveying, and, more particularly, to an apparatus for collecting residence position data for census applications and related methods.

BACKGROUND OF THE INVENTION

The census has long been used in the United States to collect general statistical and demographic information. In particular, the decennial census occurs every 10 years, in the years ending in "0," to count the population and housing units for the entire United States. Its primary purpose is to provide the population counts that determine how seats in the U.S. House of Representatives are apportioned. Census figures also are required to draw congressional and state legislative district boundaries, to allocate federal and state funds, to formulate public policy, and to assist with planning and decision-making in the private sector.

The decennial census uses both short-and long-form questionnaires to gather information. The short form asks a limited number of basic questions. These questions are asked of all people and housing units, and are often referred to as 100-percent questions because they are asked of the entire population. The long form asks more detailed information from approximately a 1-in-6 sample, and includes the 100-percent questions as well as questions on education, employment, income, ancestry, homeowner costs, units in a structure, number of rooms, plumbing facilities, etc.

Both the short-and long-term forms are mailed to housing units in the U.S. to be completed and returned to the U.S. Census Bureau for compilation of the census data. Of course, one rather large challenge which faces the Census Bureau is that many forms are never returned. As a result, to obtain accurate results, the residences which have not returned forms have to be determined, and large numbers of census takers (aka "enumerators") are employed to contact the residents and collect the census information.

This often requires that the census takers physically travel to such residences and collect this information in person. As a result, large lists of residences and corresponding directions/maps thereto have to be compiled and distributed to the laborers. Further, complete directions may not always be available for some residences, and this may cause census takers to expend a significant amount of time and money trying to locate such residences.

SUMMARY OF THE INVENTION

In view of the foregoing background, it is therefore an object of the present invention to provide a census surveying system for providing accurate positions of residences for use by census takers.

This and other objects, features, and advantages in accordance with the present invention are provided by a census surveying system which may include a residence position collection apparatus to be carried by a vehicle. The residence position collection apparatus may include a range finder for determining nearby residence positions as the vehicle advances along a path of vehicle travel over an area for the census. The census surveying system may also include a processor for downloading and processing the residence positions from the residence position collection apparatus.

More particularly, the census surveying system may also include a portable unit for use by a census taker, and the processor may download residence positions into the portable unit. The range finder may determine respective distance and angle measurements from the vehicle to the residences at measurement positions along the path of vehicle travel. Also, the residence position collection apparatus may further include a position signal receiver for determining a plurality of spaced apart vehicle positions along the path of vehicle travel based upon received signals, a movement sensing device for determining vehicle movement along the path of vehicle travel, and a controller cooperating with the position signal receiver, movement sensing device, and range finder for determining the residence positions.

The controller may determine the measurement positions based upon the plurality of spaced apart vehicle positions and the vehicle movement, and determine respective vehicle directions at the measurement positions. The controller may thus determine the residence positions based upon the respective vehicle measurement positions, the vehicle directions, and the distance and angle measurements. Moreover, the residences may have respective street addresses, and the controller may associate the respective street addresses with the residence positions.

In particular, the position determining device may include a Global Positioning System (GPS) receiver. Also, the range finder may include a laser range finder. The movement sensing device may be an inertial reference movement sensing device. The movement sensing device may also include a compass, vehicle speed sensor, and clock. Further, a camera may be included for cooperating with the controller to capture residence images. Moreover, the residences may have respective street address indicia associated therewith, and the captured residence images may include the street address indicia. Also, the vehicle may be a terrestrial vehicle including a mount for mounting the range finder to the vehicle.

A method aspect of the invention relates to a census surveying method which may include determining nearby residence positions as a vehicle advances along a path of vehicle travel over an area for the census by using a residence position collection apparatus carried by the vehicle. The residence position collection apparatus may include a range finder, for example.

More particularly, the method may also include downloading and processing the residence positions from the residence position collection apparatus. Furthermore, the residence positions may be downloaded into a portable unit to be carried by a census taker.

The range finder may determine respective distance and angle measurements from the vehicle to the residences at measurement positions along the path of vehicle travel. As such, determining the nearby residence positions may further include determining a plurality of spaced apart vehicle positions along the path of vehicle travel based upon received signals, determining vehicle movement along the path of vehicle travel, and determining the measurement positions based upon the plurality of spaced apart vehicle positions and the vehicle movement. Additionally, respective vehicle directions at the measurement positions may be determined, and the residence positions may also be determined based upon the respective vehicle measurement positions, the vehicle directions, and the distance and angle measurements.

In addition, the residences may have respective street addresses, and the method may also include associating the respective street addresses with the residence positions. Determining the vehicle positions may include using a Global Positioning System (GPS) receiver, and determining the vehicle movement may include using an inertial reference movement sensing device. Further, determining the vehicle movement may include using a compass, vehicle speed sensor and clock.

The method may also include capturing residence images. More particularly, the residences may have respective street address indicia associated therewith, and the captured residence images may include the street address indicia. In addition, the vehicle may be a terrestrial vehicle, and the method may also include mounting the range finder to the vehicle.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
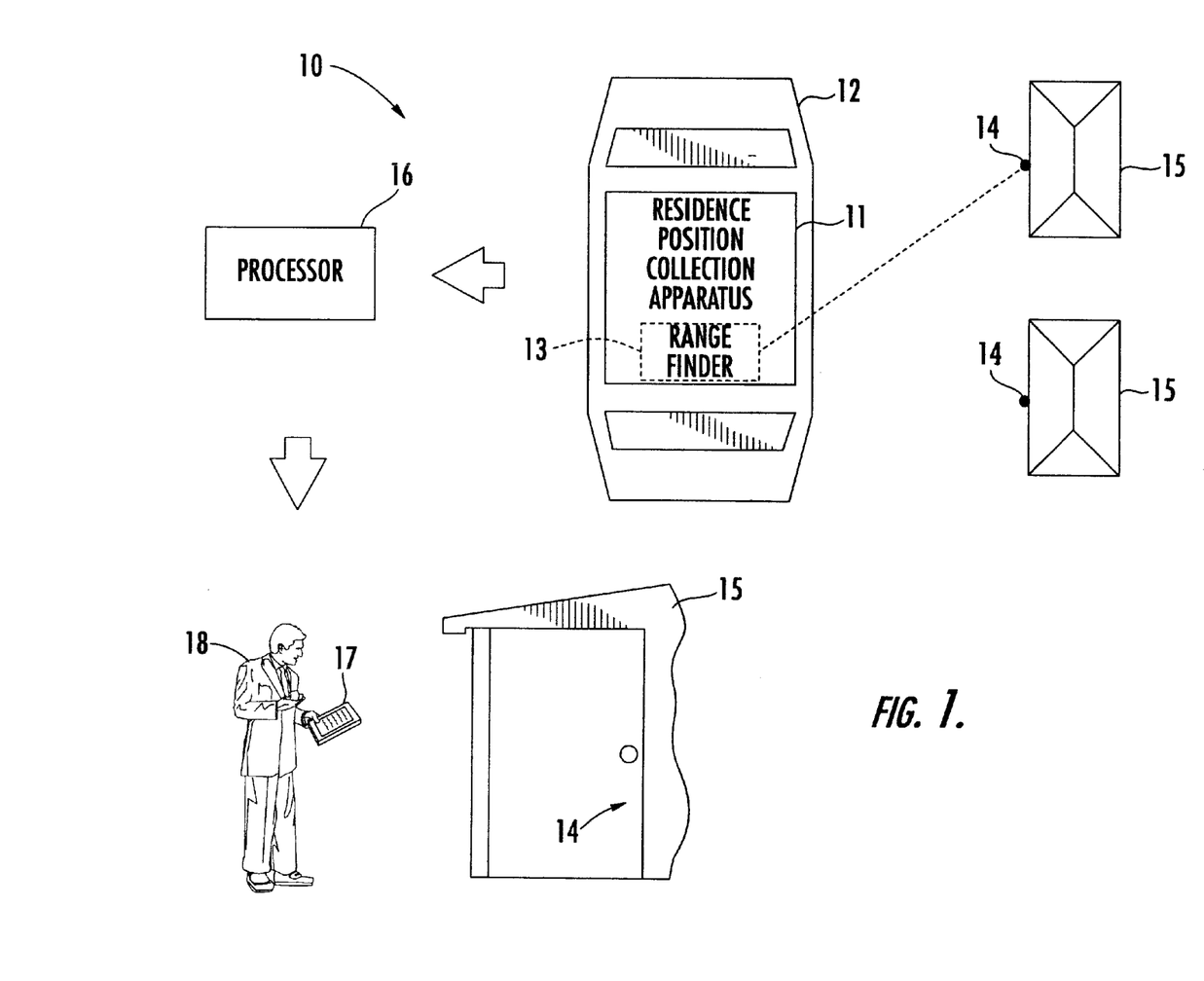
FIG. 1 is schematic block diagram illustrating a census surveying system and corresponding method according to the present invention.

Referring initially to FIG. 1, a census surveying system 10 according to the present invention is first described. The census surveying system 10 includes a residence position collection apparatus 11 to be carried by a vehicle 12. More particularly, the vehicle 12 may be a terrestrial vehicle, such as a car or truck, for example, which may be driven through residential areas for collecting census surveying information. The residence position collection apparatus 11 includes a range finder 13 (e.g., a laser range finder) for determining nearby residence positions 14 of residences 15 as the vehicle 12 advances along a path of vehicle travel 20 (FIG. 2) over an area for the census. Such an area may include a particular neighborhood, community, or other geographic grouping of residences, for example. Operation of the residence position collection apparatus 11 will be described further below.

The census surveying system 10 further includes a processor 16 for downloading and processing the residence positions 14 from the residence position collection apparatus 11. For example, the processor 16 may be a computer system, and the residence position 14 may be stored thereon along with corresponding street addresses. The processor 16 may then process the residence positions 14 to determine if census information has been collected therefrom. That is, the processor 16 compares a list of street addresses corresponding to each residence position 14 with a list of residences for which it is known that census forms have been returned.

Once the processor 16 generates a list of those residences for which no completed forms have been returned, precise geographic positions of each these residences are already stored on the processor. Accordingly, the census surveying system 10 may further include portable units 17 for use by census takers 18 to which these residence positions 14 can be downloaded from the processor 16.

Such portable units 17 may be laptop computers, personal data assistants (PDA), or other suitable devices known to those of skill in the art. Moreover, the processor 16 may further generate maps, textual directions, etc., based upon the residence positions 14 and download this information as well. Of course, such portable units 17 need not be used, as a list of residences and corresponding maps/directions corresponding to the residence positions 14 could simply be printed for the census takers 18.

Figure 2:
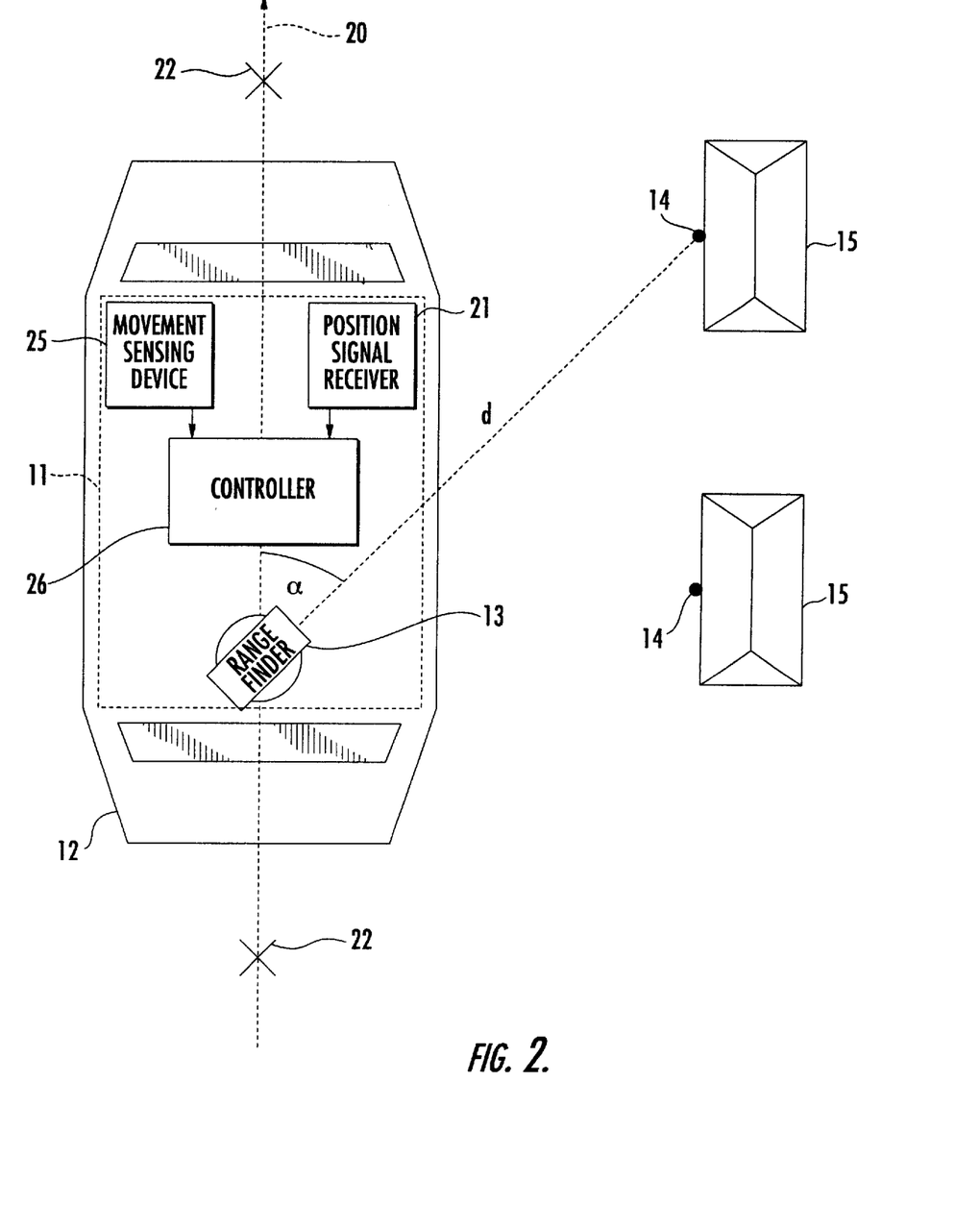
FIGS. 2 and 3 are more detailed schematic block diagrams illustrating the residence position collection apparatus of the census surveying system of FIG. 1 and usage thereof.
Figure 3:
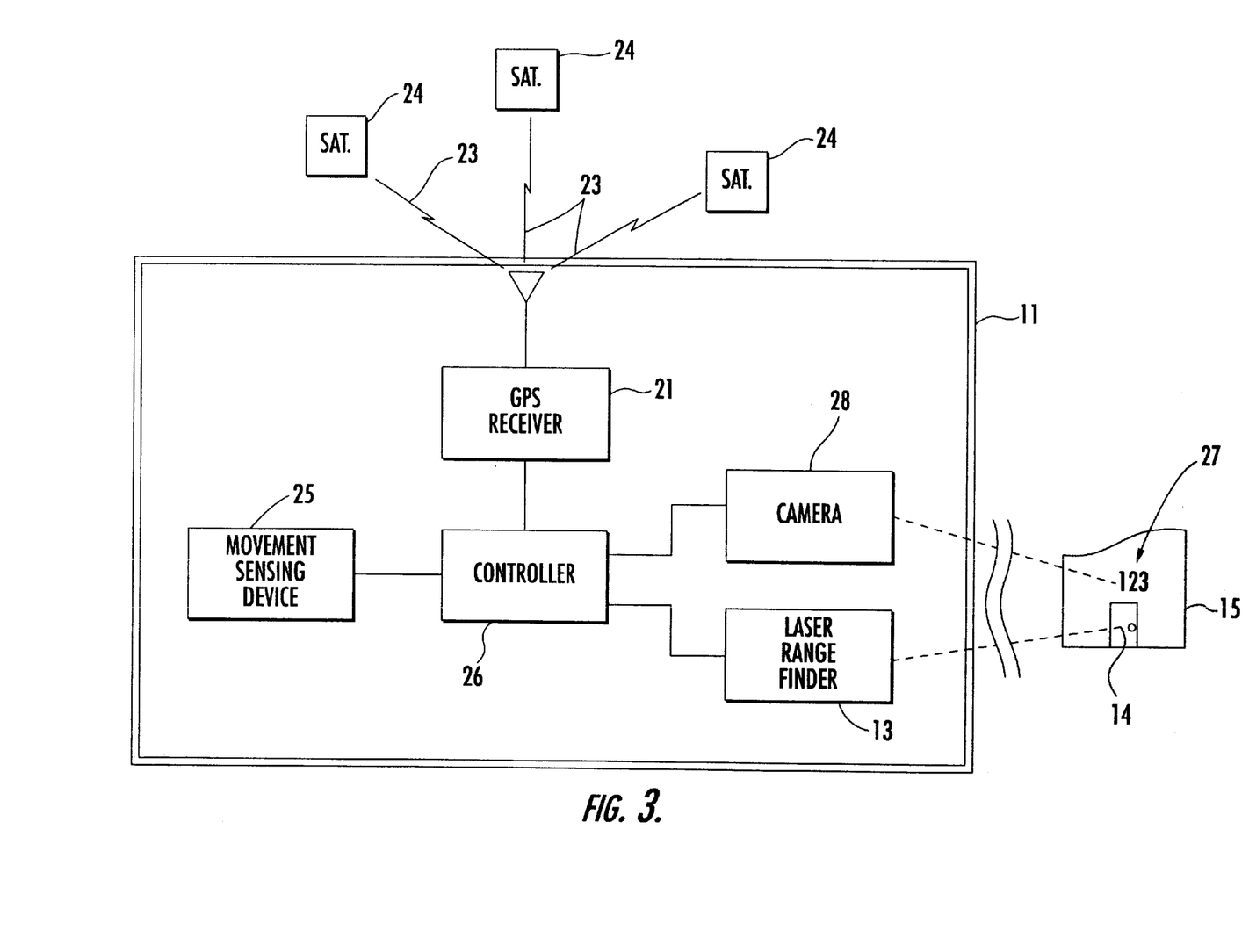

Turning now more particularly to FIGS. 2 and 3, the residence position collection apparatus 11 and operation thereof will now be further described. The range finder 13 determines respective distance d and angle α measurements from the vehicle 12 to the residences 15 at measurement positions along the path of vehicle travel 20. The residence position collection apparatus 11 also includes a position signal receiver 21, such as, for example, a GPS, loran, or cellular signal receiver (e.g., where ranging cell systems are available) for determining a plurality of spaced apart vehicle positions 22 along the path of vehicle travel 20 based upon the received signals 23. Of course, other signal receivers for use with other suitable position determining systems known to those of skill in the art may also be used.

When using a GPS signal position receiver 21, for example, positions of objects adjacent the vehicle 12 may be determined using only the GPS receiver and the range finder 13 so long as the GPS receiver can "see" the requisite number of satellites 24 (i.e., at least three) when the structure position 14 is measured. That is, to obtain a GPS reading at a particular measurement position, the GPS signal position receiver 21 will require a line of sight to at least three satellites 24 at the measurement position.

Yet, this may not always be possible when census surveying is being performed in cities where buildings, etc., may obstruct the line of sight to a satellite, or in residential areas where trees may block the line of sight, for example. Of course, this same problem may exist when using a cellular position signal receiver 21, as there may be areas in which the requisite number of cellular signals may similarly not be available for position determination.

According to the present invention, the residence position collection apparatus 11 may further advantageously include a movement sensing device 25 for determining vehicle movement along the path of vehicle travel 20. The movement sensing device 25 allows measurement locations to be determined even where vehicle positions 22 cannot otherwise be determined by the position signal receiver 21 due to signal unavailability or obstruction. The movement sensing device 25 will be further described below.

The residence position collection apparatus 11 also includes a controller 26 cooperating with the position signal receiver 21, movement sensing device 23, and range finder 13 for determining the residence positions 14. By way of example, the controller may be a laptop computer or a PDA, though other suitable devices may also be used. More particularly, the controller 26 determines the measurement positions based upon the plurality of spaced apart vehicle positions 22 and the vehicle movement. To do so, the controller 26 may first interpolate the vehicle positions 22, which are taken at known times preferably before and after the measurement position along the path of vehicle travel 20. This provides an initial estimate of the measurement positions.

The accuracy of this interpolation may then be enhanced by determining respective vehicle directions (i.e., vectors) along the path of vehicle travel 20 by statistically combining the vehicle positions 22 and the vehicle movement information. By way of example, a Kalman filter may be used for this purpose, though other suitable statistical techniques known to those of skill in the art may also be used. The controller 26 may determine the direction the range finder 13 is pointing at the time of a measurement by using a measurement of the angle of the range finder relative to the direction (i.e., a vector) at the measurement location. The vehicle 12 therefore preferably includes a mount 13 for mounting the range finder to the vehicle, such as a rotatable platform or other suitable mount, which allows this angle of the range finder to be measured. Of course, in the case where the terrain is not flat, it may also be desirable to similarly measure an angle of elevation of the range finder to the residence 15.

As a result, very accurate and reliable measurement position is provided, as will be understood by those skilled in the art. The controller 26 may then accordingly determine the residence positions 14 based upon the respective vehicle measurement positions 22, the vehicle directions, the distance d measurements, and the angle α (and, optionally, elevation angle, not shown in FIG. 2) measurements (which provides the direction of the range finder, as noted above). The determination of the residence positions 14 may be done using relatively straightforward trigonometric algorithms, as will also be appreciated by those of skill in the art. The residence positions 14 may be expressed in latitude and longitude coordinates, for example, as would similarly be provided by a GPS position signal receiver 21 at the vehicle measurement positions 22.

Typical GPS receivers compute position estimates from pseudoranges of multiple satellites using a statistical filter, such as a Kalman filter. An alternate approach for determining the residence positions 14 would be to combine the pseudoranges from the GPS position signal receiver 21, rather than the position estimates, with the above data and use a statistical filter (e.g., a Kalman filter) on the resulting combination, as will be appreciated by those of skill in the art.

As noted above, the residences 15 will typically have respective street addresses associated therewith, and the controller 26 may store the respective street addresses with the residence positions 14. For example, an operator of the residence position collection apparatus 11 may enter a street address for each residence 15 into the controller 26 (e.g., via a keyboard in the case of a laptop computer) whenever he takes a measurement with the range finder 13.

As illustratively shown in FIG. 3, an alternate technique for recording the street address is to include a camera 28 (e.g., a digital camera) with the residence position collection apparatus 11 for cooperating with the controller 26 for capturing residence images. More particularly, since many residences 15 have respective street address indicia 27 associated therewith, the camera 28 may capture residence images of the street address indicia. The camera 28 may also be positioned adjacent the range finder 13 to point in substantially the same direction thereof, and a common triggering mechanism could be used for activating both. Other techniques known to those of skill in the art may also be used for collecting and storing street address information with the corresponding structure positions.

Figure 4:
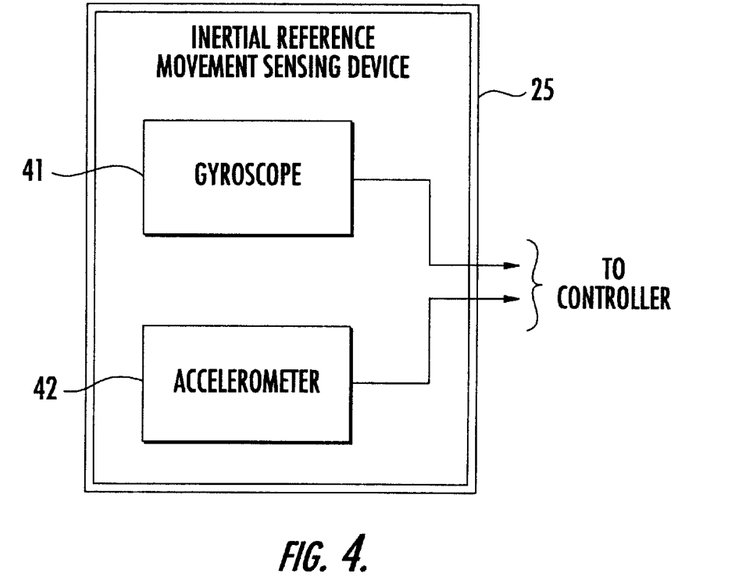
FIGS. 4 and 5 are more detailed schematic block diagrams illustrating various embodiments of the movement sensing device of the residence position collection apparatus of FIGS. 2 and 3.
Figure 5:
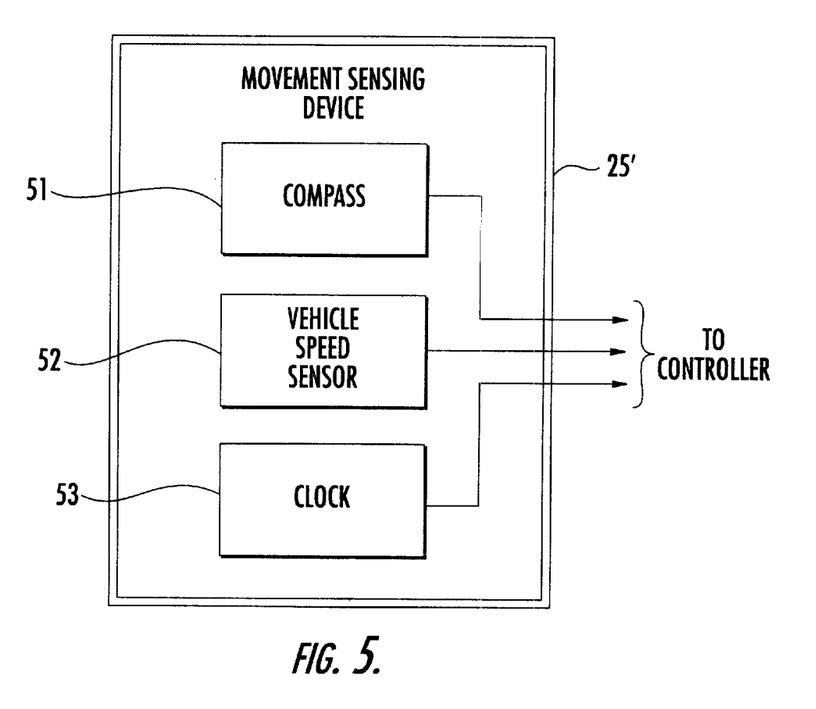

Referring now to FIGS. 4 and 5, various embodiments of the movement sensing device 25 according to the invention will now be described. As illustrated in FIG. 4, for example, the movement sensing device 25 may be an inertial reference movement sensing device including a gyroscope 41 and accelerometer 42 and using a statistical filter (such as a Kalman filter), as will be understood by those skilled in the art. In the alternate embodiment illustrated in FIG. 5, the movement sensing device 25' may include a compass 51, vehicle speed sensor 52 and clock 53.

Several attempts have been made in the prior art to use surveying to provide positions of objects for navigational purposes, etc. For example, U.S. Pat. No. 5,644,318 to Janky et al. is directed to a method for performing dynamic surveying from a moving platform using a satellite positioning system. According to the patent, such moving platforms may include a blimp, a helicopter, a plane, a remotely piloted vehicle, a rocket powered missile, and a ship, for example.

The moving platform includes a targeting device (which may include a range finder and a viewing device) for acquiring coordinates and an image of a designated remote target object. The moving platform further includes a satellite positioning system-based differential position-angular determination system capable of determining the coordinates of the moving platform and the angular coordinates of the normal vector to the moving platform. As noted in the patent, such a system may be based upon the Global Positioning System (GPS), for example.

While such prior art surveying systems may provide adequate position information for some airborne applications, for example, their ability to do so in terrestrial applications may be more limited. As noted above, at least three, and preferably four, satellite signals are required for a GPS receiver to determine a position. In airborne and ocean surveying applications, this will usually not be a problem since there are typically no objects obstructing the signal path from the satellites to the GPS receiver.

Of course, this may not be the case when a helicopter, etc. is flying through a valley and is unable to acquire the requisite number of satellite signals 23. Further, obstructions to satellite signals (e.g., buildings, trees, etc.) will likely be encountered in many terrestrial applications, such as the census surveying application described above. Accordingly, because the census surveying system 10 of the present invention advantageously includes the movement sensing device 25, it may more generally be used for determining structure positions nearby to a vehicle 12 in other applications where prior art techniques may otherwise not provide reliable and accurate measurement positions.

Figure 6:
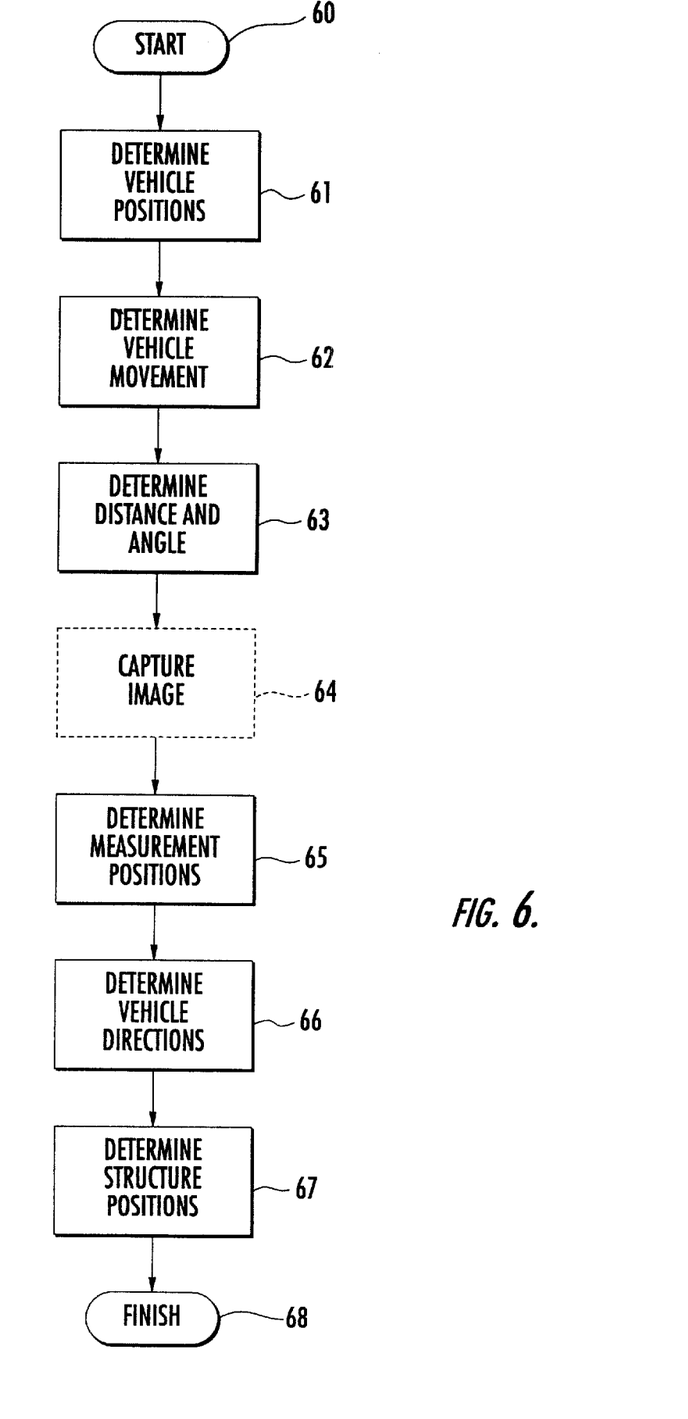
FIG. 6 is a flow diagram illustrating a method according to the present invention.

Turning now to FIG. 6, a related method aspect of the invention is for determining structure positions nearby to a vehicle 12, such as structure positions 14 of residences 15 for the purpose of census surveying, for example. Here again, the method may also be used for other surveying applications as well. The method begins (Block 60) by determining a plurality of spaced apart vehicle positions 22 (Block 61) along a path of vehicle travel 20 based upon received signals 23, and determining vehicle movement along the path of vehicle travel, at Block 62, as described above.

Furthermore, respective distance d and angle α measurements from the vehicle 12 to the structures 15 at measurement positions along the path of vehicle travel 20 are measured, at Block 63, as also described above. Again, images of the structures 15 may optionally be captured (Block 64) for storing with respective structure positions 14, and the measurement positions may be determined based upon the plurality of spaced apart vehicle positions 22 and the vehicle movement, at Block 65. Additionally, respective vehicle directions at the measurement positions may be determined (Block 66), and the structure positions 14 may thus be determined as described above, at Block 67, thus ending the method (Block 68).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A census surveying system comprising:
   a residence position collection apparatus to be carried by a vehicle and comprising a range finder for determining nearby residence positions as the vehicle advances along a path of vehicle travel over an area for the census; and
   a processor for downloading and processing the residence positions from said residence position collection apparatus.

2. The system according to claim 1 further comprising a portable unit for use by a census taker; and wherein said processor downloads residence positions into said portable unit.

3. The system according to claim 1 wherein said range finder is for determining respective distance and angle measurements from the vehicle to the residences at measurement positions along the path of vehicle travel; and wherein said residence position collection apparatus further comprises:
   a position signal receiver for determining a plurality of spaced apart vehicle positions along the path of vehicle travel based upon received signals;
   a movement sensing device for determining vehicle movement along the path of vehicle travel; and
   a controller cooperating with said position signal receiver, movement sensing device, and range finder for determining the residence positions.

4. The system according to claim 3 wherein said controller is for:
   determining the measurement positions based upon the plurality of spaced apart vehicle positions and the vehicle movement;
   determining respective vehicle directions at the measurement positions; and
   determining the residence positions based upon the respective vehicle measurement positions, the vehicle directions, and the distance and angle measurements.

5. The system according to claim 3 wherein the residences have respective street addresses; and wherein said controller associates the respective street addresses with the residence positions.

6. The system according to claim 3 wherein said position determining device comprises a Global Positioning System (GPS) receiver.

7. The system according to claim 3 wherein said range finder comprises a laser range finder.

8. The system according to claim 3 wherein said movement sensing device comprises an inertial reference movement sensing device.

9. The system according to claim 3 wherein said movement sensing device comprises a compass, vehicle speed sensor and clock.

10. The system according to claim 3 further comprising a camera cooperating with said controller for capturing residence images.

11. The system according to claim 10 wherein the residences have respective street address indicia associated therewith; and wherein the captured residence images comprise the street address indicia.

12. The system according to claim 1 wherein the vehicle comprises a terrestrial vehicle; and further comprising a mount for mounting said range finder to the vehicle.

13. A census surveying system comprising:
    a residence position collection apparatus to be carried by a vehicle for determining nearby residence positions as the vehicle advances along a path of vehicle travel over an area for the census;
    a portable unit for use by a census taker; and
    a processor for downloading the residence positions from said residence position collection apparatus, and for downloading residence positions into said portable unit.

14. The system according to claim 13 wherein said residence collection apparatus comprises:
    a position signal receiver for determining a plurality of spaced apart vehicle positions along the path of vehicle travel based upon received signals;
    a movement sensing device for determining vehicle movement along the path of vehicle travel;
    a range finder for determining respective distance and angle measurements from the vehicle to the residences at measurement positions along the path of vehicle travel; and
    a controller cooperating with said position signal receiver, movement sensing device, and range finder for determining the residence positions.

15. The system according to claim 14 wherein said controller is for:
    determining the measurement positions based upon the plurality of spaced apart vehicle positions and the vehicle movement;
    determining respective vehicle directions at the measurement positions; and
    determining the residence positions based upon the respective vehicle measurement positions, the vehicle directions, and the distance and angle measurements.

16. The system according to claim 14 wherein the residences have respective street addresses; and wherein said controller associates the respective street addresses with the residence positions.

17. The system according to claim 14 wherein said position determining device comprises a Global Positioning System (GPS) receiver.

18. The system according to claim 14 wherein said range finder comprises a laser range finder.

19. The system according to claim 14 wherein said movement sensing device comprises an inertial reference movement sensing device.

20. The system according to claim 14 wherein said movement sensing device comprises a compass, vehicle speed sensor and clock.

21. The system according to claim 13 further comprising a camera cooperating with said controller for capturing residence images.

22. The system according to claim 21 wherein the residences have respective street address indicia associated therewith; and wherein the captured residence images comprise the street address indicia.

23. The system according to claim 13 wherein the vehicle comprises a terrestrial vehicle; and further comprising a mount for mounting said range finder to the vehicle.

24. An apparatus to be carried by a vehicle for determining nearby structure positions comprising:
- a position signal receiver for determining a plurality of spaced apart vehicle positions along a path of vehicle travel based upon received signals;
- a movement sensing device for determining vehicle movement along the path of vehicle travel;
- a range finder for determining respective distance and angle measurements from the vehicle to the structures at measurement positions along the path of vehicle travel; and
- a controller connected to said position signal receiver, movement sensing device, and range finder, said controller for
  - determining the measurement positions based upon the plurality of spaced apart vehicle positions and the vehicle movement,
  - determining respective vehicle directions at the measurement positions, and
  - determining the structure positions based upon the respective vehicle measurement positions, the vehicle directions, and the distance and angle measurements.

25. The apparatus according to claim 24 wherein the structures comprise residences having respective street addresses; and wherein said controller associates the respective street addresses with the residence positions.

26. The apparatus according to claim 24 wherein said position determining device comprises a Global Positioning System (GPS) receiver.

27. The apparatus according to claim 24 wherein said range finder comprises a laser range finder.

28. The apparatus according to claim 24 wherein said movement sensing device comprises an inertial reference movement sensing device.

29. The apparatus according to claim 24 wherein said movement sensing device comprises a compass, vehicle speed sensor and clock.

30. The apparatus according to claim 24 further comprising a camera cooperating with said controller for capturing structure images.

31. The apparatus according to claim 24 wherein the vehicle comprises a terrestrial vehicle; and further comprising a mount for mounting said range finder to the vehicle.

32. An apparatus to be carried by a vehicle for determining nearby structure positions comprising:
- a Global Positioning System (GPS) signal receiver for determining a plurality of vehicle positions along a path of vehicle travel based upon received GPS signals;
- a movement sensing device for determining vehicle movement along the path of vehicle travel;
- a laser range finder for determining respective distance and angle measurements from the vehicle to the structures at measurement positions along the path of vehicle travel; and
- a controller cooperating with said GPS signal receiver, movement sensing device, and laser range finder for determining the structure positions.

33. The apparatus according to claim 32 wherein said controller is for:
- determining the measurement positions based upon the plurality of spaced apart vehicle positions and the vehicle movement;
- determining respective vehicle directions at the measurement positions; and
- determining the structure positions based upon the respective vehicle measurement positions, the vehicle directions, and the distance and angle measurements.

34. The apparatus according to claim 32 wherein the structures comprise residences having respective street addresses; and wherein said controller associates the respective street addresses with the residence positions.

35. The apparatus according to claim 32 wherein said movement sensing device comprises an inertial reference movement sensing device.

36. The apparatus according to claim 32 wherein said movement sensing device comprises a compass, vehicle speed sensor and clock.

37. The apparatus according to claim 32 further comprising a camera cooperating with said controller for capturing structure images.

38. The apparatus according to claim 32 wherein the vehicle comprises a terrestrial vehicle; and further comprising a mount for mounting said range finder to the vehicle.

39. A census surveying method comprising:
- determining nearby residence positions as a vehicle advances along a path of vehicle travel over an area for the census by using a residence position collection apparatus carried by the vehicle, the residence position collection apparatus comprising a range finder.

40. The method according to claim 39 further comprising downloading and processing the residence positions from the residence position collection apparatus.

41. The method according to claim 39 further comprising downloading residence positions into a portable unit to be carried by a census taker.

42. The method according to claim 39 wherein the range finder is for determining respective distance and angle measurements from the vehicle to the residences at measurement positions along the path of vehicle travel; and wherein determining the nearby residence positions further comprises:
- determining a plurality of spaced apart vehicle positions along the path of vehicle travel based upon received signals;
- determining vehicle movement along the path of vehicle travel;
- determining the measurement positions based upon the plurality of spaced apart vehicle positions and the vehicle movement;
- determining respective vehicle directions at the measurement positions; and
- determining the residence positions based upon the respective vehicle measurement positions, the vehicle directions, and the distance and angle measurements.

43. The method according to claim 42 wherein the residences have respective street addresses; and further comprising associating the respective street addresses with the residence positions.

44. The method according to claim 42 wherein determining the vehicle positions comprises using a Global Positioning System (GPS) receiver.

45. The method according to claim 42 wherein determining the vehicle movement comprises using an inertial reference movement sensing device.

46. The method according to claim 42 wherein determining vehicle movement comprises using a compass, vehicle speed sensor and clock.

47. The method according to claim 39 further comprising capturing residence images.

48. The method according to claim 47 wherein the residences have respective street address indicia associated therewith; and wherein the captured residence images comprise the street address indicia.

49. The method according to claim 39 wherein the vehicle comprises a terrestrial vehicle; and further comprising mounting the range finder to the vehicle.

50. A method for determining nearby structure positions comprising:

determining a plurality of spaced apart vehicle positions along a path of vehicle travel based upon received signals;

determining vehicle movement along the path of vehicle travel;

determining respective distance and angle measurements from the vehicle to the structures at measurement positions along the path of vehicle travel;

determining the measurement positions based upon the plurality of spaced apart vehicle positions and the vehicle movement;

determining respective vehicle directions at the measurement positions; and determining the structure positions based upon the respective vehicle measurement positions, the vehicle directions, and the distance and angle measurements.

51. The method according to claim 50 wherein the structures comprise residences having respective street addresses; and further comprising associating the respective street addresses with the residence positions.

52. The method according to claim 50 wherein determining the vehicle positions comprises using a Global Positioning System (GPS) receiver.

53. The method according to claim 50 wherein determining the vehicle movement comprises using an inertial reference movement sensing device.

54. The method according to claim 50 wherein determining vehicle movement comprises using a compass, vehicle speed sensor and clock.

55. The method according to claim 50 further comprising capturing structure images.

56. The method according to claim 55 wherein the structures comprise residences having respective street address indicia associated therewith; and wherein the captured residence images comprise the street address indicia.

57. The method according to claim 50 wherein the vehicle comprises a terrestrial vehicle; and further comprising mounting the range finder to the vehicle.

* * * * *